United States Patent [19]

Besik

[11] Patent Number: 4,708,000
[45] Date of Patent: Nov. 24, 1987

[54] APPARATUS FOR BALANCED HEAT RECOVERY VENTILATION - HEATING - HUMIDIFICATION - DEHUMIDIFICATION - COOLING AND FILTRATION OF AIR

[75] Inventor: Ferdinand Besik, Mississauga, Canada

[73] Assignee: Canadian Gas Research Institute, Canada

[21] Appl. No.: 25,478

[22] Filed: Mar. 13, 1987

[51] Int. Cl.⁴ .............................................. F25B 17/08
[52] U.S. Cl. ........................................ 62/480; 62/476
[58] Field of Search ................................. 62/476, 480

[56] References Cited

U.S. PATENT DOCUMENTS

| | | | |
|---|---|---|---|
| 2,319,806 | 5/1943 | Kleen | 62/480 X |
| 4,548,046 | 10/1985 | Brandon et al. | 62/480 X |
| 4,610,148 | 9/1986 | Shelton | 62/480 |
| 4,623,018 | 11/1986 | Takeshita et al. | 62/480 X |
| 4,637,218 | 1/1987 | Tchernev | 62/480 X |

Primary Examiner—Lloyd L. King

[57] ABSTRACT

A compact apparatus for residential, commercial and industrial airconditioning involving balanced heat recovery ventilation, heating, humidification, dehumidification, cooling and air filtration comprises two treatment vessels, each containing a compact packed bed of a solid sorbent material, a heater and a solid heat exchanging material, a 4-way valve for switching the flows of the exhausted stale air and the incoming fresh air between the two treatment vessels to permit a cyclic countercurrent short cycle operation of the packed beds to achieve efficient transfer of heat and moisture between the two air streams. The two treatment vessels are complemented with a combustor, a direct evaporative cooler and a solid state process controler permitting operation of the apparatus to provide the required services during the winter-heating season, summer-cooling season and the rest of the year-ventilation season to maintain comfort in the air conditioned space. Only a small amount of power is used to operate blowers to maintain the flows of the individual air streams.

18 Claims, 1 Drawing Figure

APPARATUS FOR BALANCED HEAT RECOVERY VENTILATION - HEATING - HUMIDIFICATION - DEHUMIDIFICATION - COOLING AND FILTRATION OF AIR

FIELD OF INVENTION

The present invention relates to an apparatus for cyclic countercurrent transfer of heat and mass in compact packed beds of a solid sorbent material and a solid heat exchanging material for use in air conditioning applications and in industrial adsorption separation operations.

BACKGROUND OF THE INVENTION

Due to energy conservation awareness of the public and the building industry, new standards for energy efficient buildings include more stringent requirements on air tightness, insulation, mechanical ventilation, air cleaning and space heating - cooling loads.

As the loads for heating - cooling of the more energy efficient housing has been reduced, their air tightness brought up a need for a continuous mechanical exchange of indoor air with outdoor air to avoid potential health hazards and or house demage problems. Consequently, mechanical ventilation of new houses has become one of the required standard air conditioning services.

The required ventilation of new houses is being provided by various heat recovery ventilation systems build around various types of air to air heat exchangers equipped with defrost controls and with various effectiveness ratings. At below freezing temperatures these systems suffer ice build up problems causing up to 50% drop in heat recovery effectiveness and air delivery capacities.

The other space heating, cooling, humidifying, dehumidifying and air filtration services are being provided by various individual appliances and at considerable capital and operating costs.

The space heating services may be provided by appliances that may include a conventional warm air central heating, hydronic or a water circulating central heating system or an electric or fossil fuel fired unitary systems. For the central systems energy sources may be any fossil fuel or electric power, and the central furnaces and boilers may be conventional, high efficiency or ultra high efficiency condensing types.

The cooling systems may include indirect, direct or a combination of indirect - direct evaporative cooling systems, absorption chillers and mechanical vapour compression systems with the absorption and mechanical vapour compression systems providing simultaneously the required dehumidification and with the evaporative cooling systems providing the required humidification.

An independent dehumidification can be also provided by various mechanical vapour compression dehumidifiers and or dessicant dehumidifiers, and humidification by various concepts humidifiers.

Air filtration can be provided by various mechanical, chemical or electronic air filters, either built into the central heating cooling systems or by various unitary systems.

Integrated appliances providing the required heating - cooling humidification - dehumidification and air filtration are also available and usually combine the various individual appliances into a compact system with the heat recovery ventilation system as a separate system.

Because of the complexity and high capital and operating costs of the current art systems providing the above services for individual homes, a more simple and more energy efficient concept and apparatus capable of providing the described services is needed.

SUMMARY OF INVENTION

In accordance with embodyments of the present invention, it has now been found that a high energy efficient balanced ventilation heating - humidification - air filtration during the heating season, a high energy efficient balanced ventilation - cooling - dehumidification - air filtration during the cooling season, and a high energy efficient ventilation during the rest of the year for individual homes can be provided by a simple apparatus comprising two treatment vessels containing packed beds of a solid sorbent material, a heater and a solid heat exchanging material, a 4-way valve, a combustor, a direct evaporative cooler and a solid state process controler.

In accordance with embodyment of the present invention it has now been found that the energy efficiency of a cyclic balanced ventilation cooling - dehumidification system can be substantially increased by the presence of two packed beds in a single vessel and by carrying out the desorption of the adsorbed moisture in two stages with the additional energy input being provided only during the second stage desorption period, with the sorption heat being recovered and used during the first stage desorption period.

It has been also found that the energy efficiency of a cyclic balanced ventilation - heating - humidification system can be substantially increased by the presence of a sorbent and heat exchanging materials in a single vessel with the sorbent material increasing the effectiveness in transfering the sensible and latent heat and moisture between the two air streams.

It has been also found that the above two substantially different operations, one required during the cooling season, the other required during the heating season, can be provided with high efficiency by the same packed bed apparatus.

While the apparatus of the present invention is being described as intended for use in individual homes, it is also equally suitable for use in other residential, institutional, commercial or industrial air conditioning applications and also in various industrial adsorption separation operations involving adsorption of vapours followed by thermal desorption of the adsorbed components.

GENERAL DESCRIPTION OF THE INVENTION

Figure 1:
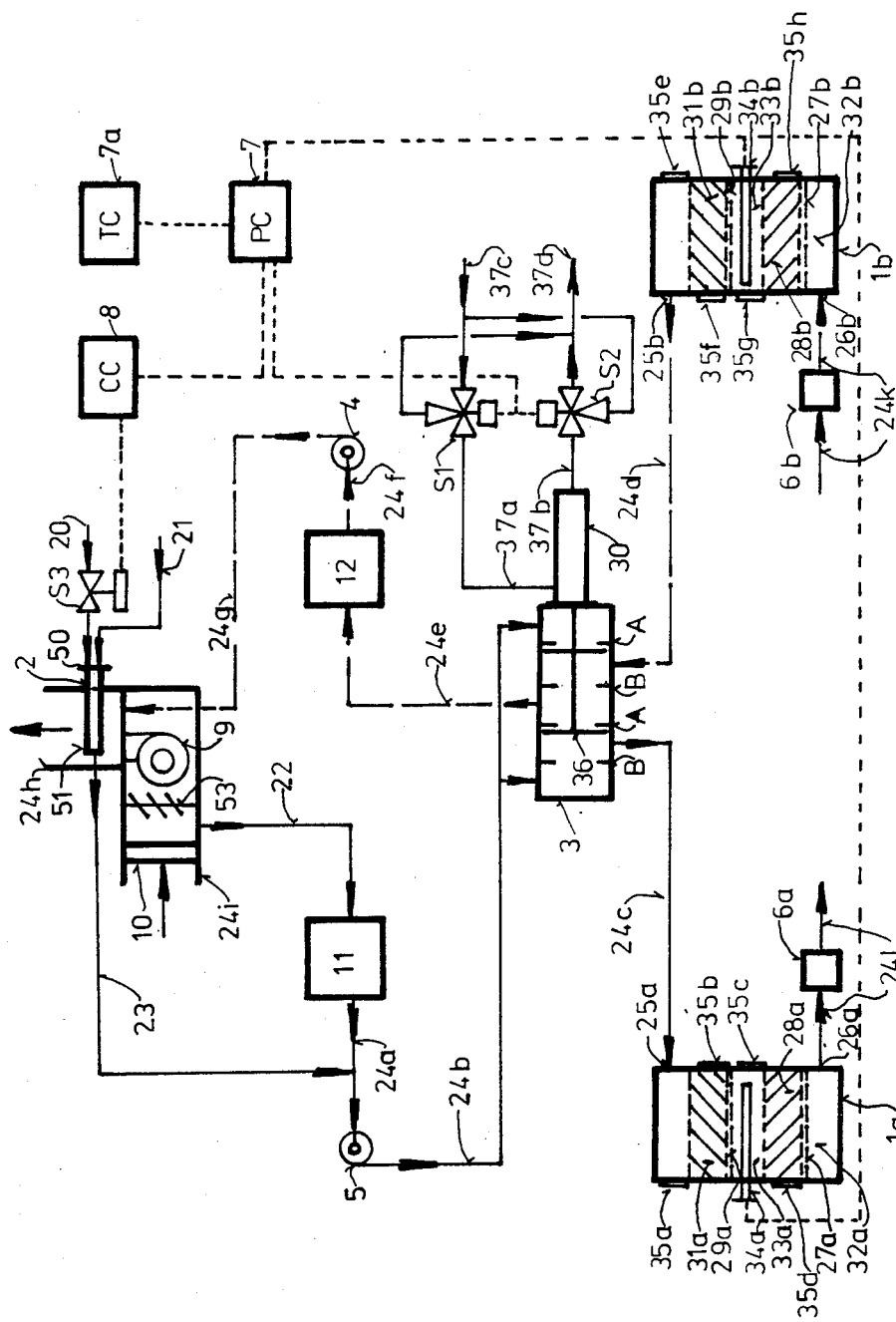
FIG. 1 is a schematic of one preferred embodyment of the apparatus of the present invention capable of providing the required services of balanced ventilation, heating, humidification, cooling, dehumidification and air filtration for the individual home.

Engineering principles of the unit operation of adsorption are known and documented and the operation is effectively used in many applications involving recovery of solvents, separation of petrochemicals, separation of oxygen and nitrogen from air, removing of toxic gases from gas streams and removing of moisture from liquid and gaseous products. Similarly, principles of evaporative cooling are well known and the operation is broadly used including air conditioning applications.

Adsorption systems used in dehumidification of air may use an adsorbent-desiccant structure which may be a fixed bed, a moving bed, or a rotating bed which may be a disc, drum or wheel, and containing a suitable adsorbent-desiccant or which structure may be filled with an inert porous solid material impregnated with liquid absorbent such as lithium chloride.

The fixed bed systems may use a single, two, or more fixed packed beds of granular sorbent, are provided with a valve arrangement permitting the cycling of the treated air and the regenerant streams between individual fixed beds, and can simulate a perfect countercurrent system. The rotating systems are equipped with suitable rotating mechanism to rotate the adsorbent bed between the processed air and regenerant streams which are separated from each other by seals to prevent mixing. All systems are equipped with an adsorbent reactivation subsystem. The reactivation of spent adsorbent may be either by the heat energy of the regenerant, by evacuation of the adsorbent bed, by heating of the bed, by an inert dry gas or by some combination thereof.

It is well known that the amount of moisture removed from air by adsorption depends on properties of the adsorbent, on the temperature of the adsorbent during adsorption, on the temperature, pressure and humidity of the treated air, and on the contact time of the treated air with the adsorbent.

It is also known that the effectiveness of reactivation of spent adsorbent depends on the rate and magnitude of change of the moisture adsorbent equilibrium, which depends on the reactivation temperature, pressure, vapour pressure of moisture in regenerant and heat capacity of the adsorbent.

It is also known that the released adsorption heat and the residual heat retained by adsorbent from previous desorption cycle cause an increase in the temperature of the adsorbent bed and of the treated air and inhibit the effectiveness of removal of moisture.

It is also known that adiabatic cooling of dry air in direct contact with water reduces the treated air temperature and that the resulting air - water temperatures depend on the dry bulb temperature and initial humidity of the air, initial temperature of the water and on the effectiveness of the evaporator. And it is also well known that the quality of the out door air depends on weather conditions and location.

While all the above process principles are known and well documented, it remains, that the current art sorption cooling systems can not produce the required low temperatures of the treated air as efficiently as the mechanical vapour compression systems.

It is therefore one object of the present invention to provide a sorption - dehumidification - cooling apparatus capable of producing the low temperature low humidity fresh air from moist outdoor air with substantially higher thermal efficiency than that of the current art systems.

To achieve this objective, the present invention provides an apparatus in which the moist air is simultaneously : dehumidified by sorption in a fixed bed of solid sorbent material, the released heat of sorption is recovered in a fixed packed bed of a heat exchanging material, the dehumidified air is cooled in a fixed bed of the heat exchanging material, the stale air is exhausted from the air conditioned space, the exhausted stale air is used for cooling of the heat exchanging material and for recovery of the sorption heat from the heat exchanging material and for removal of a major portion of moisture from the sorbent material during the first stage desorption period, and with addition of heat energy for removal of the residual moisture from the sorbent material during the second stage desorption period.

Additional cooling and humidification of the dehumidified and cooled air is achieved in a conventional direct evaporative cooler.

To achieve the other objective of the present invention, i.e. to provide energy efficient ventilation - heating - humidification the present invention provides an apparatus in which the heat content of combustion products from a fuel combustor and the heat and moisture from the exhausted stale air is temporarily absorbed into packed beds of a solid heat exchanging material and a solid sorbent material and then released into a stream of filtered outdoor air and circulating air in a cyclic countercurrent operation of the invented packed bed apparatus.

Considerable technical literature is available on the heat transfer process, process apparatus, design, operation and optimisation of packed bed systems operating on the principle that heat is temporarily absorbed in solids as a sensible or latent heat to be released later at designated times and conditions. Example of such collecting and releasing of heat in a continuous cyclic operation are the check-work regenerators used for preheating combustion air in open-hearth furnaces, ingot soaking pits, glass melting tanks, heat treating furnaces, blast furnace stoves, etc., constructed of various fire clay or silica brick shapes or tiles, or pebbles.

Although considerable ingenuity has been applied to the design of the checkerwork, involving variations in bricklaying patterns and design of special ceramic shapes, the checkerwork regenerators still exhibit engeneering defects including (a) high initial cost of construction, (b) unsatisfactory thermal efficiency, (c) inaccessibility of surface causing lost time and high cost in cleaning operations, (d) cracking of bricks due to thermal stress induced with rapid temperature changes, and (e) high temperature swings of the heated air leaving the regenerative heat exchanger. The higher thermal efficiency of the apparatus of the present invention as compared with the current art systems is accredited to the dual packed beds in the treatment vessels, to a short operating cycle and to a relatively smaller size of the solid sorbent and heat exchanging material particles.

DESCRIPTION OF PREFERRED EMBODIMENTS

Referring to drawing, FIG. 1 shows one preferred embodiment of the invented apparatus in a schematic form contemplated for use in residential air conditioning involving balanced heat recovery ventilation, heating, cooling, humidification, dehumidification and air filtration.

The invented apparatus includes two compact double bed treatment units 1a, 1b, equipped with a single 4-way valve 3 operated by actuator 30 through solenoid valves S1, S2 and solid state process controller 7. The apparatus also includes a combustor indicated generally at 2 and provided with a gas valve S3, combustion controls 8, fuel line 20, combustion air line 21, exhausted stale air line 22 and combustion products discharge line 23. In addition the apparatus also includes blowers 4, 5, 9, air filters 6a, 6b, 10, air damper 53 and direct evaporative coolers 11, 12.

The blowers 4, 5, the treatment vessels 1a, 1b and the combustor 2 are circuitiously fluidically interconnected by a series of air carrying conduits 24a through 24f which operate to permit the flow of the exhausted stale air, combustion products, and the incoming fresh air there-between under the influence of the blowers 4, 5. Another conduit 24g interconnects the outlet of blower 4 with the discharge air plenum 24h. The conduits 24a through 24h are constructed of standard steel or other suitable material of a large enough flow area to minimise flow resistances.

The two treatment vessels 1a, 1b are identical, each being a closed vessel provided with an intake-exit opening 25a, 25b located in the upper part, an intake-exit opening 26a, 26b located in the lower part, a built in horizontal support screen partition 27a, 27b in the lower part for holding a solid sorbent material packed bed 28a, 28b, a built in horizontal support screen partition 29a, 29b in the upper part for holding a solid heat exchanging material packed bed 31a, 31b, an empty chamber 32a, 32b for distribution and collection of the air flowing upwardly and downwardly through packed beds 28a, 28b, 31a, 31b, a chamber 33a, 33b located between the two beds 28a, 31a, and 28b, 31b, a built in heater 34a, 34b for heating the downwardly flowing air stream, and flanged openings 35a through 35h for replacement of the sorbent and heat exchanging materials.

The heat exchanging material used in packed beds 31a, 31b may be ceramic, stone, or fired clay gravel or pebbles, or fired pellets of iron ore or other suitable high thermal capacity pelletized minerals. The preferred size of the gravel, pebbles or pellets is in the range from $\frac{1}{4}$ to 1 inch equivalent particle diameter. The crosssectional area of the packed beds is selected with view to the acceptable pressure drop, preferreably with frontal gas velocities being in the range from 100 to 300 ft/min. The top level of the packed bed is located at the same level as the flanged openings 35a, 35e with the hight of the packed bed dictated by the desired thermal effectiveness.

The solid sorbent material may be any of the commercially available adsorbents - dessicants, or it may be an inexpensive porous ceramic gravel impregnated with a suitable commercially available absorbent such as lithium chloride or lithium bromide. The preferred particle size of the sorbent material is in the range from $\frac{1}{8}$ to $\frac{1}{4}$ inch equivalent particle diameter.

The heaters 34a, 34b may be natural gas, propane, oil or other fuel burners equipped with standard on-off combustion controls, or electric heaters, or finned heating coils heated by a suitable heating medium.

The 4-way valve 3 has a double plunger 36 which moves between positions A and B by action of an air or a hydraulic cylinder 30 actuated by a suitable operating fluid through solenoid valves S1, S2 interconnected via conduits 37a through 37d. Operation of the 4-way valve 3 is controlled by a solid state process controller which also interacts with temperature controls 7a. The plunger 36 of the 4-way valve 3 moves between positions A and B in preselected time intervals with two such time intervals representing the duration time of a complete operating cycle.

Since the apparatus is capable of operating either in a heating mode, ventilating mode, dehumidifying mode and or cooling mode, the process controller 7 can accommodate four different operations of the apparatus, i.e. heating, ventilating, dehumidifying and cooling.

To achieve the four different operations of the cyclic apparatus, there are three substantially different operating cycles, i. e. the ventilating cycle, the heating cycle and the sorption cycle.

The ventilating cycle comprises a heating period followed by a cooling period with the duration time of the heating period being equal to duration time of the cooling period.

The heating cycle comprises a heating period followed by a washing period and a cooling period. The combined duration time of the two heating and washing periods equals the first half of the operating cycle, the cooling period equals the second half of the operating cycle. The length of the washing period preferably equals only a small fraction of the heating period, it can be varied, and if it is desired it can be also completely eliminated.

The sorption cycle comprises a sorption period followed by a first stage desorption period and second stage desorption period, with the duration time of the sorption period being equal to the duration time of the two desorption periods.

The solid state process controller 7 includes a variable on-off timer and a series of time delay relays interconnected with combustion controls 8 and temperature controls 7a to permit the operation of the apparatus in the four different operating modes in accordance with the three different operating cycles.

The temperature controls 7a may be a conventional thermostat controlling the temperature conditions in the air conditioned space and interacting with the process controller 7.

The combustor 2 comprises a standard atmospheric burner 50 provided with electronic ignition and standard combustion controls 8, and a tubular combustion chamber 51 located in the air discharge plenum 24h. It should be understood, that various types of commercially available burners and controls or complete combustors may be used to achieve same results. The combustor 2 preferably operates under negative pressure with all combustion air being drawn through the burner 50 and combustion chamber 51 with combustion products being mixed with the exhausted stale air downstream of the evaporative cooler 11 in conduit 24a.

The evaporative coolers 11, 12 may be any suitable commercially available conventional direct evaporative cooler and are provided for adiabatic cooling of the treated air streams.

The filters 6a, 6b, 10 are conventionally available air filters provided for removal of particulate matter.

The operation of the apparatus of FIG. 1 in the four different operating modes is as follows:

In the heating mode:

With the evaporative coolers 11, 12 and heaters 34a, 34b not operating, the atmospheric burner 50 receives fuel via line 20 and combustion air via line 21 and burns the fuel in combustion chamber 51. Combustion products discharged from combustion chamber 51 are drawn via conduit 23 into conduit 24a by blower 5. Return air withdrawn from occupied space by blower 9 enters the apparatus through filter 10 located in the return air intake plenum 24 i, air damper 53, then it is forced by blower 9 into the air discharge plenum 24h to be heated by the combustion chamber 51 and by the heated fresh air discharged from conduit 24g into the air discharge plenum 24h.

For the period of time plunger 36 of the 4-way valve 3 remains in position A, blower 5 draws combustion products via conduit 23 and stale air from conduit 24i via conduit 22 into and through the non operating cooler 11 into conduit 24a, then forces the mixture of combustion products and stale air through conduit 24b, 4-way valve 3, conduit 24c, intake-exit opening 25a into vessel 1a, then downwardly through packed bed 31a, chamber 33a, packed bed 28a into chamber 32a, then out of vessel 1a via intake-exit opening 26a and out of apparatus via conduit 24l and filter 6a.

Simultaneously, the cool outdoor air is drawn by blower 4 through filter 6b, conduit 24k, intake-exit opening 26b into chamber 32b of vessel 1b, then upwardly through packed bed 28b, chamber 33b, packed bed 31b, then out ofvessel 1b via intake-exit opening 25b, then via conduit 24d, 4-way valve 3, conduit 24e into and through the non operating cooler 12, conduit 24f into blower 4, then it is forced by blower 4 via conduit 24g into the air discharge plenum 24h.

During the time plunger 36 remains in position A the packed beds 31a, 28a are being heated by absorbing heat from the exhausted stale air and combustion products, which mixture of stale air and combustion products in turn is being cooled from a higher entering temperature to a lower exiting temperature, with the heated packed bed materials having the highest temperature at the top of the packed bed 31a and the lowest temperature at the bottom of packed bed 28a.

Simultaneously, packed beds 28b, 31b are being cooled by the cool fresh air flowing upwardly through the packed beds 28b, 31b. As packed beds 28b, 31b are releasing the previously absorbed heat and moisture, the fresh air is being humidified and heated from its lower entering temperature to its highest temperature at which it exits from the top of the packed bed 31b and out of the vessel 1b. During the described time period when packed beds 28a, 31a are being heated and packed beds 28b, 31b are being cooled, the temperature of the cooled exhausted mixture of stale air and combustion products leaving the packed bed 28a is slowly rising, while the temperature of the heated fresh air leaving the packed bed 31b is slowly dropping. It is known that these temperature swings of these two air streams for a given mass of used packed bed material and for the given flow rates of the two air streams depend only on the length of the heating - cooling periods, i.e. on the time plunger 36 remains in position A or B. The shorter is this time, the smaller are the temperature swings of the two air streams and the higher is the thermal effectiveness of the packed bed apparatus.

When plunger 36 moves from position A to position B, the two air streams are switched between the two vessels 1a, 1b with the mixture of the exhausted stale air and combustion products now being forced downwardly through packed beds 31b, 28b while the cool fresh air now is being drawn upwardly through packed beds 28a, 31a, thus eventually completing the operating cycle of heating and cooling for each of the two packed beds 28a, 31a and 28b, 31b. Since changing the position of plunger 36 from position A to position B, or from position B to position A takes only a fraction of a second, the flow of the two air streams is essentially continuous. Since the warm mixture of the exhausted stale air and combustion products during the heating period flows through the packed beds downwardly, while the cool fresh air flows during the following cooling period through same packed beds upwardly, the heat and moisture transfer is perfectly countercurrent. Since the duration time of both heating and cooling periods is relatively short, the temperature profile of the packed bed materials in the axial direction is approximately linear, and consequently, the magnitude of the temperature swing of the heated fresh air is approximately equal to the magnitude of temperature swing of the packed bed material at the top of the packed bed 31a, 31b, while the magnitude of the temperature swing of the cooled mixture of the stale air and combustion products is about equal to the magnitude of the temperature swing of the packed bed material at the bottom of the packed bed 28a, 28b. Consequently, controlling the duration time of the operating cycle permits control of the temperature swings of the two air streams and control of the thermal effectiveness of the packed bed apparatus. It then follows, that the shorter is the duration time of the operating cycle, the more efficient is the utilization of the sorbent and heat exchanging materials. Consequently, the overal size of the packed bed apparatus can be reduced, and or the thermal effectiveness increased by reducing the duration time of the operating cycle. The duration time of the operating cycle for the invented apparatus is therefore preferreably maintained in the range from 60 to 600 seconds.

To prevent the contamination of the incoming fresh air by a small amount of combustion products remaining in the packed beds after completion of the heating period and to reduce the amount of moisture transfered from the exhausted stale air into the incoming fresh air, if such is desirable, a short washing period is included in the first half of the heating cycle, with the cooling period being equal to one half of the heating cycle. The heating cycle is maintained by the process controller 7 which interacts with combustion controls 8 and causes the gas valve S3 to be closed during the washing period, during which only the stale air and the combustion air flows through the apparatus.

After completion of the washing period process controller 7 causes plunger 36 of the 4-way valve 3 to change position and to reopen the gas valve S3 to start new heating and cooling periods. The cool fresh air is now drawn through the previously heated and washed packed bed materials and is therefore free of any residual combustion products. Any desired length of the washing period can be maintained by the process controller 7.

Typical operating conditions and quality of air streams at different points through the apparatus when operating in a heating mode is given in Example 1.

In the ventilating mode:

With the combustor 2, evaporative coolers 11, 12 and heaters 34a 34b not operating, the operation of the apparatus controlled by the process controller 7 operating in the ventilating mode with the ventilating cycle is same as that described under the heating mode.

In the cooling mode:

With the combustor 2 not operating and with the gas line 20 and combustion air line 21 being closed, during the time when plunger 36 of the 4-way valve 3 remains in position A, the warm humid outdoor air is drawn by blower 4 from outdoor through filter 6b, conduit 24k, intake - exit opening 26b into chamber 32b of vessel 1b, then upwardly through screen 27b, packed bed 28b, into chamber 33b, then upwardly through packed bed 31b and out of vessel 1b via intake - exit opening 25b, then through 4-way valve 3 into and through evaporative cooler 12, then into blower 4 which then forces the fresh air via conduit 24g into the air discharge plenum 24h.

Simultaneously, stale air is drawn by blower 5 from the return air intake plenum 24i via conduit 22 into and through evaporative cooler 11 into blower 5, then it is forced through 4-way valve 3 and intake - exit opening 25a into vessel 1a, then downwardly through packed bed 31a into chamber 33a, then downwardly through packed bed 28a into chamber 32a, then out of vessel 1a via intake-exit opening 26a into conduit 24l, then through filter 6a out of apparatus. In the midle of the operating cycle plunger 36 of the 4-way valve 3 changes its position from position A to position B causing a switch of the two air streams between the two vessels 1a 1b.

During the first half of the operating cycle, designated as sorption cycle, while the warm humid air from outdoor is drawn by blower 4 through vessel 1b the following heat and mass transfer operation occure in vessels 1a, 1b simultaneously:

In vessel 1b:

The warm humid outdoor air when flowing upwardly through packed bed 28b is dehumidified by sorption of the air moisture onto the active sorbent material. The released sorption heat and the residual heat retained by the sorbent material from the preceded second stage desorption period are conveyed by the dried and heated outdoor air into the packed bed of the heat exchanging material 31b which packed bed during the preceded two desorption periods was cooled by the adiabatically cooled exhausted stale air.

Simultaneously, as the heat exchanging material in packed bed 31b is being heated the dried outdoor air passing through packed bed 31b is being cooled. With respect to the perfectly countercurrent cyclic flow of the two air streams through packed beds in vessels 1a, 1b, the dehumidified outdoor air when passing through the packed bed of the heat exchanging material 31b is cooled down very close to the temperature of the adiabatically cooled exhausted stale air exiting from cooler 11. Because the packed bed of the heat exchanging material has a large heat transfer surface area and heat storage capacity, and because of the perfectly countercurrent flow of the two air streams and relatively short operating cycle, heat transfer effectiveness as high as 95% in packed beds 31a, 31b is economically feasible.

In vessel 1a:

The exhausted stale air adiabatically cooled in the evaporative cooler 11 when flowing downwardly through the packed bed of the heat exchanging material 31a, which heat exchanging material was heated during the preceded sorption period, is being heated up by absorbing heat released from the heat exchanging material while the heat exchanging material is being cooled. As the temperature of the exhausted stale air is increased, its relative humidity is reduced and its capacity to remove moisture from the sorbent material is increased. Because of the high thermal effectiveness of the packed bed of the heat exchanging material 31a in retaining sorption heat, major portion of the adsorbed moisture can be effectively removed from the sorbent material during the first stage desorption period during which heater 34a is off and the preheated stale air flows from packed bed 31a downwardly through chamber 33a, then through packed bed 28a and out of vessel 1a via intake exit opening 26a. The remaining moisture is then removed from the sorbent material during the second stage desorption period, during which heater 34a is on and is heating the preheated stale air flowing through chamber 33a and then through packed bed 28a. In the middle of the operating cycle plunger 36 changes its position from position A to position B initiating a sorption period in vessel 1a and first desorption period in vessel 1b.

In this manner the packed bed apparatus 1a, 1b of this invention produces a continous stream of dehumidified and cooled fresh outdoor air, which is then drawn by blower 4 via conduit 24e into a conventional evaporative cooler 12 where it is adiabatically cooled to its final low temperature. The washed and cooled outdoor air is then drawn from the evaporative cooler 12 by blower 4 and then forced via conduit 24g into the air discharge plenum 24h.

During the described cooling mode of operation when blower 9 may be off, damper 53 has to be closed to prevent bypassing of the cool outdoor via blower 9 into the return air intake plenum 24l and out via cinduit 22. As mentioned above, the stale air is drawn by blower 5 from return air plenum 24l via conduit 22 into and through a conventional evaporative cooler 11 where its temperature is adiabatically reduced before being forced by blower 5 through the packed bed apparatus.

Since in the cyclic operation of the packed bed apparatus 1a 1b conduits 24l, 24k alternately serve the incoming outdoor air and the discharged stale air, both conduits are provided with filters 6a, 6b to prevent intake of particulate matter with the incoming outdoor air into the apparatus. Reversing of the flow of the two air streams through filters 6a, 6b however, helps to extend the operating life of these filters.

Typical operating conditions and the quality of the two air streams at different point through the apparatus is given in Example 2.

In the dehumidifying mode:

With combustor 2, evaporative coolers 11, 12 not operating, the operation of the apparatus controlled by process controler 7 operating in the dehumidifying mode with the sorption cycle is same as that described under the cooling mode.

As evident from the described preferred embodyment of the present invention, Example 1 and Example 2, the apparatus of the present invention is simple and capable of providing balanced heat recovery ventilation, heating, humidifying, dehumidifying, cooling and filtration of air as may be required by individual homes.

While the present invention has been described with reference to a specific embodyment, it should be understood, that different requirements may require modification in design as well as in operation which may still retain the invented principles.

The described 4-way valve for instance can be conveniently replaced by two powered 3-way valves or by four powered single way valves or air dampers to achieve same performance of the apparatus. Various powered valving systems are commercially available and may be used with the invented apparatus as now should be obvious to one of ordinary skill in the art.

The actual circuits of controler 7 and the associated solid state timer, transducers, relays and temperature sensors were not given in detail inasmuch as any number of different circuits can perform the same function.

It should be also understood, that if desired, the blower 4 can be eliminated by using blower 9 to draw both the outdoor air and return air with the flow of the two air streams being controlled by damper 53, operation of which may be automatic or manual as is the current practice with large air conditioning systems.

The selected calculated data are summarized in TABLE 1.

TABLE 1

| | | Selected process data for processed air through the apparatus. | | | | | | | |
|---|---|---|---|---|---|---|---|---|---|
| | | Exhausted stale air | Combust. products | Heat exchanger | | | | Circulation air | |
| | | | | Hot air str. | | Cold air str. | | | |
| Parameter | Units | | | in | out | in | out | in | out |
| Dry bulb temp. | °F. | 70.0 | 800.0 | 142.0 | 21.5 | 0.0 | 124 | 70.0 | 168.0 |
| Humidity | lb H20 / lb d.a. | .0058 | — | .0151 | .010 | .0005 | .0055 | .0058 | .0057 |
| Enthalpy | BTU / lb d.a. | 23.18 | — | 51.94 | 15.9 | .5 | 36.52 | 23.18 | 46.7 |
| Dry air | lb/hr | 912.0 | 88.4 | 1000.4 | 1000.4 | 1000.4 | 1000.4 | 3500.4 | 3500.4 |
| Water | " | 5.3 | 9.8 | 15.1 | 10.1 | .5 | 5.5 | 20.3 | 20.0 |
| Heat | BTU/hr × $10^3$ | 21.14 | 30.82 | 51.96 | 15.92 | .5 | 36.54 | 81.14 | 163.7 |

Overall balanced heat recovery ventilation - heating efficiency = 82.5%

Or, if only dehumidification is required both evaporative coolers and combustor may be eliminated.

Or, while the apparatus has been described with use of a gas fired combustor, it should be obvious that use of electric heaters is feasible with still retaining the principal features and benefits of the invented packed bed apparatus.

While the apparatus of the present invention has been described as being effective in transferring moisture and heat between two air streams, it should be understood, that it can be also effectively used in other cyclic gas adsorption separation operations involving adiabatic adsorption of other sorbates when followed by thermal reactivation of the-spent adsorbent.

EXAMPLES

Example 1

The following are calculated data based on First law analysis of the prosess and the apparatus operating in the heating mode supported by thermodynamic properties of moist air and assuming equilibrium conditions.

Design conditions:
Input: 100.000 HTU/hr.
Ventilation rate: 219 SCFM
Outdoor conditions:
 Dry bulb temperature: 0° F.
Enthalphy: 0.5 BTU/lb d.air
Indoor conditions:
Dry bulb temperature: 70° F.
Enthalpy: 23.18 BTU/lb d. air
Operation is continuous with combustor on.

Example 2

The following are calculated data based on thermodynamic analysis of the cooling process carried out in the apparatus of the present invention supported by material and energy balances and thermodynamic properties of moist air assuming equilibrium relations.

Design conditions:
Outdoor air:
 dry bulb temperature: 90.0 F
 wet bulb temperature: 82.0 F
Indoor conditions:
 dry bulb temperature: 80.0 F
 wet bulb temperature: 66.5 F
Source of energy for heaters: Natural gas
Operation is continuous The selected calculated data are summarized in Table 2.

TABLE 2

| | | Selected process data for processed air through the apparatus. | | | | | | | | |
|---|---|---|---|---|---|---|---|---|---|---|
| | | Outdoor air | | | | Exhausted air | | | | |
| Parameter | Units | in | leaving sorbent mat. | leaving heat. ex. mat. | leaving cooler | in | leaving cooler | leaving heat. ex. mat. | leaving sorbent I stage | leaving heater II stage |
| Dry bulb temp. | °F. | 90 | 217.0 | 75.7 | 55.0 | 80 | 68.3 | 209.6 | 112.0 | 276.0 |
| Humidity | lb H20 / lb d.a. | .022 | .004 | .004 | .0085 | .011 | .014 | .014 | .037 | .014 |
| Enthalpy | BTU / lb d.a. | 46.0 | 58.5 | 22.5 | 22.5 | 31.5 | 31.5 | 67.5 | 67.5 | 87.0 |

Heat removed from outdoor air: 23.5 BTU/lb d.a.
Heat removed from conditioned space: 9.0 BTU/lb d.a.
Heat energy used in heaters: 7.9 BTU/lb d.a.
Moisture removed from outdoor air: .0135 lb/lb. d.a.
COP — coolig outdoor air: 2.97
COP — conventional absorbtion chiller: .6–.9

SUMMARY OF THE DISCLOSURE

In summary of this disclosure, the present invention provides an apparatus involving cyclic heat and mass transfer in two consecutive packed beds, one containing a solid sorbent material, the other a solid heat exchanging material, with an efficient recovery of the released sorption heat and use of the sorption heat in reactivation of the sorbent material.

The apparatus has been described as being used in air conditioning applications involving balanced heat recovery ventilation, heating, humidification, dehumidification, cooling and air filtration.

The apparatus of the present invention has the capability to operate in four different modes, i.e. a ventilating mode, heating mode, humidifying mode and a cooling mode.

Using two treatment vessel, each containing a packed bed of a solid sorbent material and a packed bed of a solid heat exchanging material and an internal heater, and equipped with a single 4-way valve, and operating in a sequenced cyclic countercurrent mode, the flow of the two treated air streams is essentially continuous. Because of the involved short operating cycle the required mass of the used solid sorbent and heat exchanging materials is relatively small and the mass and heat transfer efficiencies are high. Because of efficient recovery and use of the sorption heat in a two stage reactivation of the solid sorbent material, energy economy of the apparatus is substantially increased.

The apparatus of the present invention is simple, requires minimum maintenance, can operate unattended, uses inexpensive sorbent and heat exchanging materials and uses substantially less energy than prior art separate service systems.

It is to be understood, that while the invention has been described with reference to specific embodiment and in specific applications to demonstrate the features and advantages of the invented apparatus, such specific embodiment is susceptible to modifications to fit other applications. For example, the specific materials or temperatures, flowrates, operating cycles, sorbate, configuration of the packed beds retaining vessels or valving specified in the presented embodiment, all can be readily altered to suit other objectives or applications. Accordingly, the foregoing description is not to be construed in a limiting sense.

What is claimed is:

1. An apparatus for cyclic countercurrent transfer of heat and mass between two gaseous streams involving packed beds of a solid sorbent material and a solid heat exchanging material in a short operating cycle, said apparatus comprising:

two closed vessels, each being provided with at least one intake-exit opening located in the upper part and at least one intake-exit opening located in the lower part, each said vessel having in its lower part a built in horizontal support screen partition for holding said packed bed of said solid sorbent material and a built in horizontal support screen partition in its upper part for holding said packed bed of said solid heat exchanging material, and having at least two flanged openings located on its side wall provided for replacement of said solid sorbent and heat exchanging materials, said solid sorbent material providing a porous packed bed and removing sorbate from one of said two gaseous streams during the first half of the operating cycle and then releasing said sorbate into the other gaseous stream during the second half of the operating cycle, said solid sorbent material being any of the commercially available adsorbents, or an inexpensive porous solid material impregnated with a suitable commercially available adsorbent such as lithium chloride or lithium bromide, said solid heat exchanging material providing a porous packed bed and adsorbing heat from one of said two gaseous streams during said first half of the operating cycle and then releasing said adsorbed heat into the other said gaseous stream during said second half of said operating cycle, said heat exchanging material being any of ceramic, stone, or fired clay gravel or pebbles, or fired pellets of iron ore, or other high thermal capacity pelletized minerals, said one of said two gaseous streams flowing downwardly through said packed beds, said the other gaseous stream flowing upwardly through said packed beds, said flow of said two gaseous streams being cyclic and alternating between said two vessels, valving means connected to said intake-exit openings located in the upper part of said vessels provided for intake of one and exit of the other gaseous streams into and out of said vessels and for switching the flows of said two gaseous streams in preselected time intervals in the middle of said operating cycle between said two vessels to facilitate said cyclic countercurrent transfer of heat and mass between said two gaseous streams in said apparatus, process control means for controlling said operating cycle and for maintaining a continuous operation of said valving means and said apparatus in said preselected time intervals, blower means connected to said valving means provided for flowing said two gaseous streams countercurrently with respect to each other through said packed beds, conduit means interconnecting said blower means with said valving means and with said vessels and providing for the intake, flow and discharge of said two gaseous streams into, through and out of said apparatus, and filter means for removing particulate matter from said two gaseous streams entering said apparatus.

2. Apparatus of claim 1 with said operating cycle being a ventilating cycle comprising a heating period followed by a cooling period with the duration time of said heating period being equal to the duration time of said cooling period.

3. Apparatus of claim 1 comprising in addition circulation gas conduit means equipped with circulation blower means provided for intake and discharge of a recirculated gaseous stream, filter means located in said circulation gas conduit means upstream of said circulation blower means for removing particulate matter from said recirculated gaseous stream, damper means located upstream of said circulation blower means for controlling the flow of said recirculated gaseous stream, said circulation gas conduit means having an opening located upstream of said damper means for withdraving one of said two gaseous streams from said recirculated gaseous stream by said blower means, and an opening located downstream of said damper means for flowing the other of said two gaseous streams treated in said packed beds into said circulation gas conduit means.

4. Apparatus of claim 3 comprising in addition an electric heater means located in said circulation gas conduit means downstream of said circulation blower means for heating of said recirculated gaseous stream with operation of said electric heater means being controlled by said process control means.

5. Apparatus of claim 3 comprising in addition combuster means for combustion of fossil fuel, said combustor means being located in said circulation gas conduit means, said combustor means being equipped with standard combustion controls interconnected with said process control means, with combustion products being withdrawn from said combustor means by said blower means and mixed with said gaseous stream withdrawn by said blower means from said circulation gas conduit means and then forced by said blower means through said valving means into and through said vessels and being treated in said packed beds before being discharged out of said apparatus, said process control means including temperature control means, said process control means maintaining the operation of said apparatus in accordance with said operating cycle, said operating cycle being either a ventilating cycle or a heating cycle, said ventilating cycle comprising a heating period followed by a cooling period with duration time of said heating and cooling period being equal, said heating cycle comprising a heating period followed by a washing period and a cooling period, with combined duration time of said heating and washing periods being equal to duration time of said cooling period.

6. Apparatus of claim 1 with said each vessel in addition being provided with heater means located between said packed bed of said sorbent material and packed bed of said heat exchanging material, said heater means heating said gaseous stream flowing downwardly through said packed beds in accordance with said operating cycle, said operating cycle comprising a sorption period followed by a first stage desorption period and a second stage desorption period, with duration time of said sorption period being equal to the combined duration time of said first and second stage desorption periods, said duration time of said first stage period being substantially larger than duration time of said second stage desorption period, with said heater means operating only during said second stage desorption period.

7. Apparatus of claim 6 comprising in addition a direct evaporative cooler for adiabatic cooling of one of said two gaseous streams before flowing said gaseous stream into said vessels for treatment in said packed beds, with gaseous stream flowing downwardly through said packed beds, with operation of said evaporative cooler being controlled by said process control means.

8. Apparatus of claim 6 comprising in addition a direct evaporative cooler for cooling of said gaseous stream flowing upwardly through said packed beds then through said valving means into and through said evaporative cooler, with operation of said evaporative cooler being controlled by said process control means.

9. Apparatus of claim 7 comprising in addition a direct evaporative cooler for cooling of said stream flowing upwardly through said packed beds then through said valving means into and through said evaporative cooler, with operation of said evaporative cooler being controlled by said process control means.

10. Apparatus of claim 6 comprising in addition circulation gas conduit means equipped with circulation blower means provided for intake and discharge of a recirculated gaseous stream, filter means located in said circulation gas conduit means up-stream of said circulation blower means for removing particulate matter from said recirculated gaseous stream, damper means located upstream of said circulated blower means for controlling the flow of said recirculated gaseous stream, said circulation gas conduit means having an opening located upstream of said damper means for withdrawing one of said two gaseous streams from said circulation gas conduit means by blower means, and an opening located downstream of said damper means for flowing the other of said two gaseous streams treated in said packed beds into said circulation gas conduit means.

11. Apparatus of claim 10 comprising in addition electric heater means located in said circulation gas conduit means for heating of said recirculated gaseous stream, with operation of said electric heater means being controlled by said process control means, said process control means including temperature control means, said process control means maintaining the operation of said apparatus in accordance with said operating cycle, said operating cycle being either a ventilating cycle, sorption cycle, or a heating cycle, said ventilating cycle comprising a heating period followed by a cooling period with duration time of said heating period being equal to duration time of said cooling period, said sorption cycle comprising a sorption period followed by first stage desorption period and a second stage desorption period with duration time of said sorption period being equal to combined duration time of said first and second stage desorption periods, and said heating cycle a heating period followed by a washing period and a cooling period with combined duration time of said heating and washing periods being equal to duration time of said cooling period.

12. Apparatus of claim 10 comprising in addition combustor means for combustion of fossil fuel, said combustion means located in said circulation gas conduit means, said combustor means being provided with combustion controls interconnected with said process control means, with combustion products being withdrawn from said combustor means by said blower means, said combustion products being mixed with said gaseous stream withdrawn by said blower means from said circulation gas conduit means and then forced by said blower means through said valving means into and through said vessels and being treated in said packed beds before being discharged out of said apparatus, said process control means including temperature control means, said process control means maintaining the operation of said apparatus in accordance with said operating cycle, said operating cycle being either a ventilating cycle, sorption cycle or a heating cycle, said ventilating cycle comprising a heating period followed by a cooling period with duration time of said heating period being equal to duration time of said cooling period, said sorption cycle comprising a sorption period followed by first stage desorption period and a second stage desorption period with duration duration time of said first and second stage desorption periods, and said heating cycle comprising a heating period followed by a washing period and a cooling period with duration time of said cooling period being equal to combined duration time of said heating and washing periods.

13. Apparatus of claim 11 comprising in addition a direct evaporative cooler for adiabatic cooling of said gaseous stream withdrawn by said blower means from said circulation gas conduit means before forcing said gaseous stream by said blower means into and through said vessels, with operation of said evaporative cooler being controlled by said process control means.

14. Apparatus of claim 11 comprising in addition a direct evaporative cooler for cooling of said gaseous stream flowing upwardly through said packed beds then through said valving means into and through said evaporative cooler, with operation of said evaporative cooler being controlled by said process control means.

15. Apparatus of claim 13 comprising in addition a direct evaporative cooler for cooling of said gaseous stream flowing upwardly through said packed beds then through said valving means into and through said evaporative cooler, with operation of said evaporative cooler being controlled by said process control means.

16. Apparatus of claim 12 comprising in addition a direct evaporative cooler for adiabatic cooling of said gaseous stream withdrawn by said blower means from said circulation gas conduit means before forcing said gaseous stream by said blower means into and through said vessels, with operation of said evaporative cooler being controlled by said process control means.

17. Apparatus of claim 12 comprising in addition a direct evaporative cooler for cooling of said gaseous stream flowing upwardly through said packed beds then through said valving means into and through said evaporative cooler, with operation of said evaporative cooler being controlled by said process control means.

18. Apparatus of claim 16 comprising in addition a direct evaporative cooler for cooling of said gaseous stream flowing upwardly through said packed beds then through said valving means into and through said evaporative cooler, with operation of said evaporative cooler being controlled by said process control means.

* * * * *